United States Patent

Kondo et al.

[11] Patent Number: 6,025,091
[45] Date of Patent: Feb. 15, 2000

[54] CELL GASKET MADE OF POLYBUTYLENE TEREPHTHALATE

[75] Inventors: Hirokazu Kondo, Minami-Ashigara; Takuji Yamada, Miyagi, both of Japan

[73] Assignees: Fuji Photo Film Co., Ltd., Kanagawa; Fuji Film Celltec Co., Ltd., Miyagi, both of Japan

[21] Appl. No.: 09/063,071

[22] Filed: Apr. 21, 1998

[30] Foreign Application Priority Data

Apr. 22, 1997 [JP] Japan ..................................... 9-104365

[51] Int. Cl.⁷ ..................................................... H01M 2/08
[52] U.S. Cl. .......................... 429/174; 429/175; 429/185; 429/186; 429/194
[58] Field of Search ..................................... 524/601, 605; 525/437; 528/308.6; 429/175, 185, 186, 194, 174

[56] References Cited

U.S. PATENT DOCUMENTS 5,833,160 11/1998 Enomoto et al. ........................ 242/348
5,851,693 12/1998 Sano et al. ............................... 429/174

FOREIGN PATENT DOCUMENTS

| | | | |
|---|---|---|---|
| 53-84122 | 7/1978 | Japan | H01M 2/08 |
| 55-50573 | 4/1980 | Japan | H01M 2/08 |
| 60-35452 | 2/1985 | Japan | H01M 2/08 |
| 61-58157 | 3/1986 | Japan | H01M 2/08 |
| 5-211057 | 8/1993 | Japan | H01M 2/08 |

*Primary Examiner*—James J. Seidleck
*Assistant Examiner*—Olga Asinovsky
*Attorney, Agent, or Firm*—Sughrue, Mion, Zinn, Macpeak & Seas, PLLC

[57] ABSTRACT

A gasket for sealing a metal cell can with a metal terminal cap, wherein the gasket contains polybutylene terephthalate.

11 Claims, 3 Drawing Sheets

CELL GASKET MADE OF POLYBUTYLENE TEREPHTHALATE

This application is based on Japanese patent application No. HEI-9-104365 filed on Apr. 22, 1997, the entire contents of which are incorporated herein by reference.

BACKGROUND OF THE INVENTION a) Field of the Invention

The present invention relates to a cell gasket, and more particularly to a cell gasket capable of preserving a good sealing performance even under severe conditions such as high temperature, or to a cell using such a gasket.

b) Description of the Related Art

Known materials of a cell gasket include polyethylene, polypropylene, copolymers of polyethylene and polypropylene, polyolefine thermoplastic resin, various kinds of rubber and the like, as described in JP-A-SHOU-53-84122 and JP-A-SHOU-55-50573. Of these materials, polypropylene in particular is easy to be molded and inexpensive so that gaskets made of polypropylene are widely used for any shape of cells including a coin type, a cylinder type and the like, and or any type of cells including alkali cells such as nickel hydrogen cells and non-aqueous electrolyte cells such as lithium cells.

However, after a long term use of alkali electrolyte cells and non-aqueous electrolyte cells as secondary cells, an inner gas pressure of these cells may rise or the cells are exposed to a high temperature so that a creep phenomenon or cracks of the gasket material are easy to occur. Many problems are therefore likely to occur, such as leakage of electrolyte, lowered cell performance caused by reduced electrolyte or by mixed water contents. In order to solve these problems, other materials have been proposed. For example, polyamide resin containing 20 to 30 weight % of alkali resistant engineering plastics (polyethylene terephthalate, polybutylene terephthalate, or the like) as described in JP-A-HEI-5-211057, polypropylene having a specific Rockwell hardness as described in JP-A-SHOU-60-35452, and polypropylene having a specific elastic modulus of flexure as described in JP-A-SHOU-61-58157. It cannot be said that these materials are effective in practical use, and improvements thereof have been desired.

SUMMARY OF THE INVENTION

It is an object of the present invention to provide a gasket of a sealing assembly capable of more reliably sealing a cell, or a cell using such a gasket.

According to one aspect of the present invention, there is provided a gasket for sealing a metal cell can with a metal terminal cap, wherein the gasket contains polybutylene terephthalate.

By using a gasket containing polybutylene terephthalate, electrolyte leakage from the cell can be prevented.

DETAILED DESCRIPTION OF THE PREFERRED EMBODIMENTS

Preferred embodiments of the invention have the following features. The invention is not limited to only these embodiments.

(1) A gasket for sealing a metal cell can with a metal terminal cap, wherein the gasket is mainly made of polybutylene terephthalate.

(2) The gasket described in (1), wherein wherein polybutylene terephthalate has a thermal deformation temperature of 140 to 200° C. at a load of 4.6 kgf/cm$^2$ by ASTM-D648 measurement and a Rockwell hardness, as stipulated by ASTM-D785, of 60 to 110 in M scale.

(3) The gasket described in (1), wherein polybutylene terephthalate has a tensile break expansion, as stipulated by ASTM-D638, in a range from 25% or larger to smaller than 1000%.

(4) The gasket described in (1), wherein polybutylene terephthalate has a thermal deformation temperature of 150 to 180° C. at a load of 4.6 kgf/cm$^2$ by ASTM-D648 measurement, a Rockwell hardness, as stipulated by ASTM-D785, of 70 to 90 in M scale, and an elastic break expansion, as stipulated by ASTM-D638, in a range from 100% or larger to 500% or smaller.

(5) A cell having a metal cell can, a metal terminal cap, and a gasket described in (1) to (4) for sealing the metal cell can with the metal terminal cap.

(6) The cell described in (5), further including non-aqueous electrolyte placed in the metal cell can.

(7) The gasket described in (1), wherein the gasket consists of 100 weight parts of polybutylene terephthalate and 35 weight parts or less of additive material.

Embodiments of the invention will be detailed hereinunder.

Figure 1:
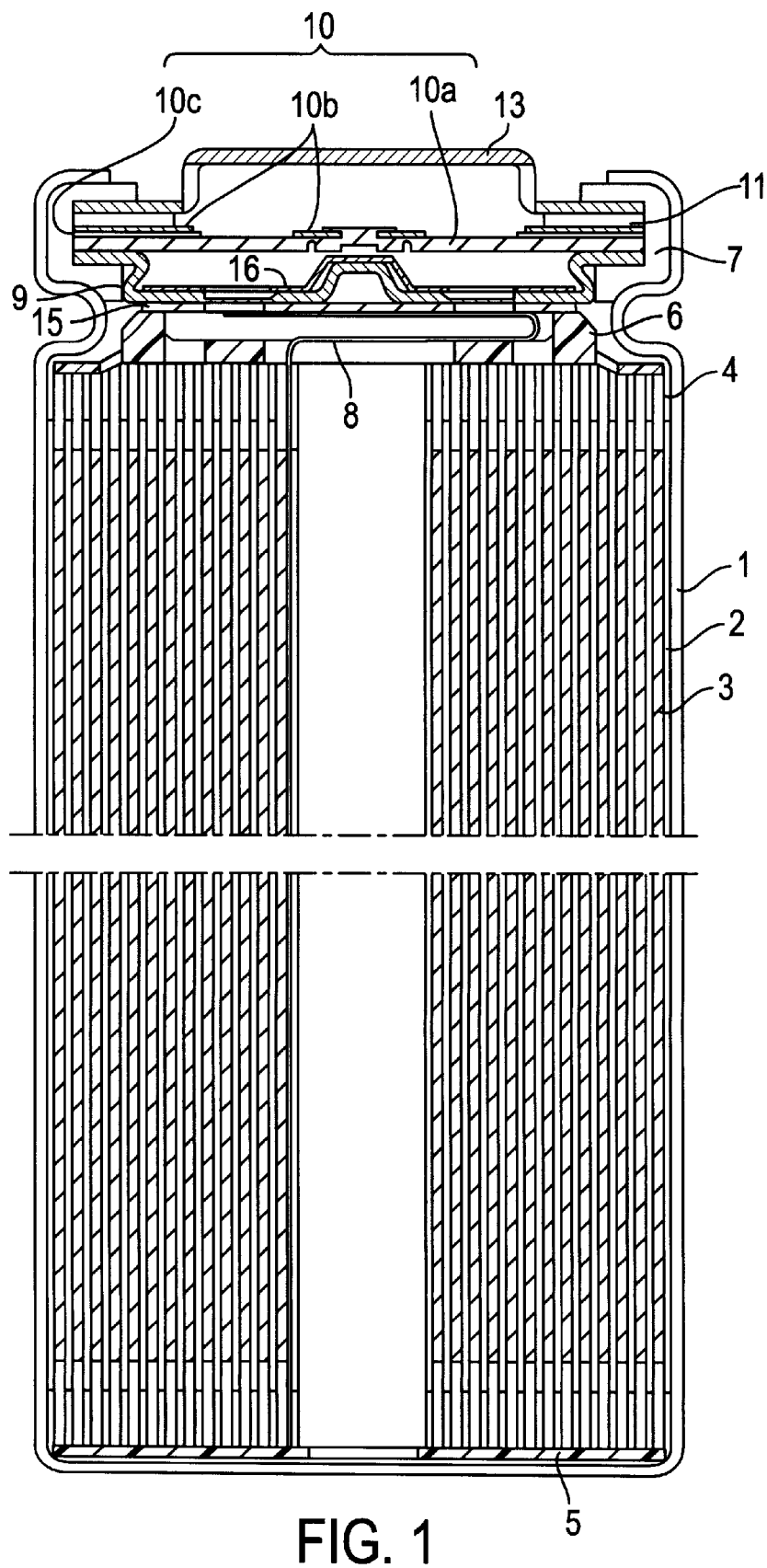
FIG. 1 is a cross sectional view of a cylindrical cell used for a gasket according to an embodiment of the invention.

FIG. 1 is a cross sectional view of a cylinder type cell. The shape of the cell may be a cylinder block or a rectangular block. If a winding core circular in section is used, a cylinder type cell can be manufactured, and if a winding core rectangular in section is used, a rectangular block type cell can be manufactured. Positive and negative sheet electrodes together with separators 4 are wound and inserted into a cell can 1. The negative sheet electrode 2 is electrically connected to the cell can 1. Electrolyte is permeated into the inside of the can 1 which is sealed with a terminal cap 13 to form a cell. The terminal cap 13 serves as the positive electrode terminal and is hermetically fitted in an upper opening of the can 1 by using a gasket 7. The positive sheet electrode 3 is electrically connected to the terminal cap 13, via a positive lead 8, a welded plate 15, an anti-explosion valve 9, a current breaker 10, and a positive temperature coefficient (PTC) resistor ring 11.

The sealing assembly is constituted of the gasket 7 and a lamination of the terminal cap 13, PTC ring 11, current breaker 10 and anti-explosion valve 9 stacked in this order from the upper position and fitted in the gasket 7. The terminal cap 13 exposes on the surface of the cell, and the anti-explosion valve 9 is mounted inside of the cell. An insulating cover 16 covers the upper surface of the anti-explosion valve 9. The current breaker 10 has first and second conductive bodies 10a and 10b and an insulating ring 10c.

The sheet electrode assembly is made of the positive and negative sheet electrodes 3 and 2 and separators 4 wound in a roll. Between the sheet electrode assembly and the anti-explosion valve 9, an upper insulating plate 6 is disposed. This upper insulating plate 6 electrically insulates the sheet electrode assembly from the sealing assembly and from the cell can 1. A lower insulating plate 5 disposed between the sheet electrode assembly and the cell can 1 electrically insulates the former from the latter.

The gasket 7 is used for hermetically sealing the metal cell can 1 with the metal terminal cap 13. The gasket 7 may be used with any of a coin type cell, a rectangular block type cell, and a cylinder type cell. The gasket is preferably used with secondary cells, and more preferably with alkaline electrolyte secondary cells and non-aqueous electrolyte secondary cells.

The material of the gasket 7 is preferably polybutylene terephthalate (PBT).

The gasket 7 may be made of PBT alone or polymer alloy mixed with another polymer. PBT reinforced with glass fibers may also be used. The gasket 7 preferably contains PBT. Compounds used for polymer alloy or reinforced PBT include inorganic materials such as glass fibers and glass beads, and organic compounds such as olefinic polymer, rubber polymer, polyamide, polycarbonate, polyester ether elastomer. The amount of such an additive material is preferably 35 weight parts or less, more preferably 20 weight parts or less, or most preferably 0.1 weight part or more or 10 weight parts or less, respectively relative to 100 weight parts of PBT.

The gasket 7 used in the sealing assembly is required to have a proper elasticity and shock resistance even at a high temperature in order to preserve a sufficient sealing performance. Polybutylene terephthalate used as the material of the gasket 7 has preferably a thermal deformation temperature of 140 to 200° C. at a load of 4.6 kgf/cm$^2$ measured by ASTM-D648 method, and a Rockwell hardness as stipulated by ASTM-D785 of 60 to 110 in M scale. More preferably, the thermal deformation temperature is 150 to 180° C. and the Rockwell hardness in M scale is 70 to 90.

PBT satisfying the above-described thermal deformation temperature and Rockwell hardness preferably has a tensile break expansion of 25% or more stipulated by ASTM-D638, or more preferably 100% or more or 60% or less.

Figure 2A:
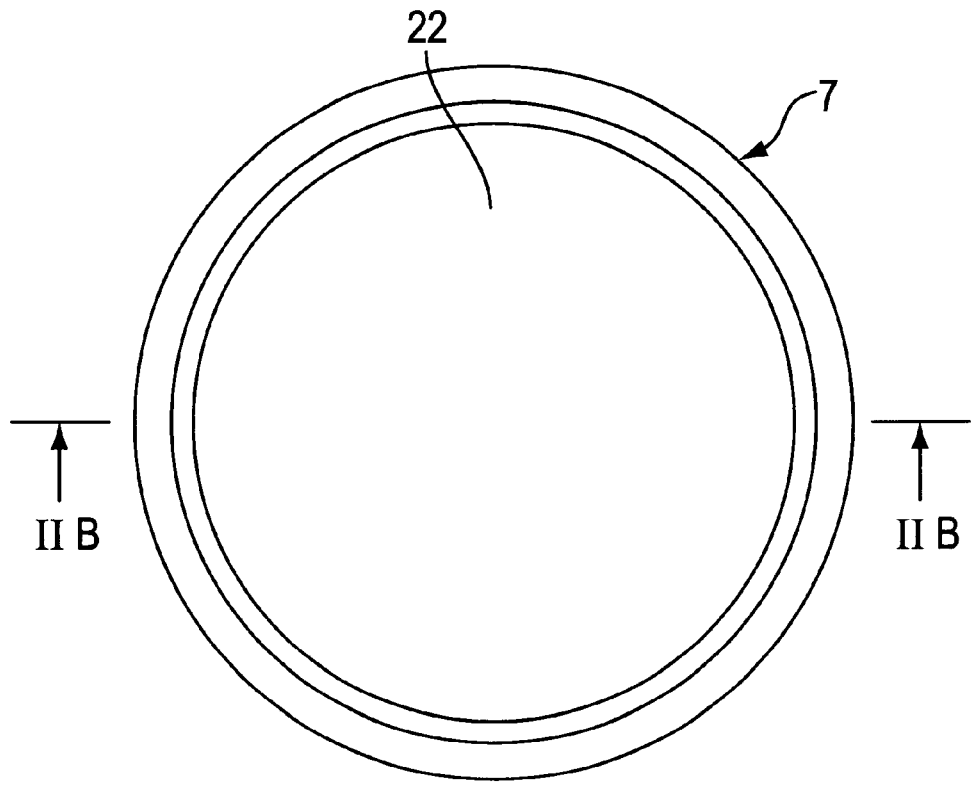
FIG. 2A is a plan view of a gasket and FIG. 2B is a cross sectional view taken along line IIB—IIB of FIG. 2A.
Figure 2B:
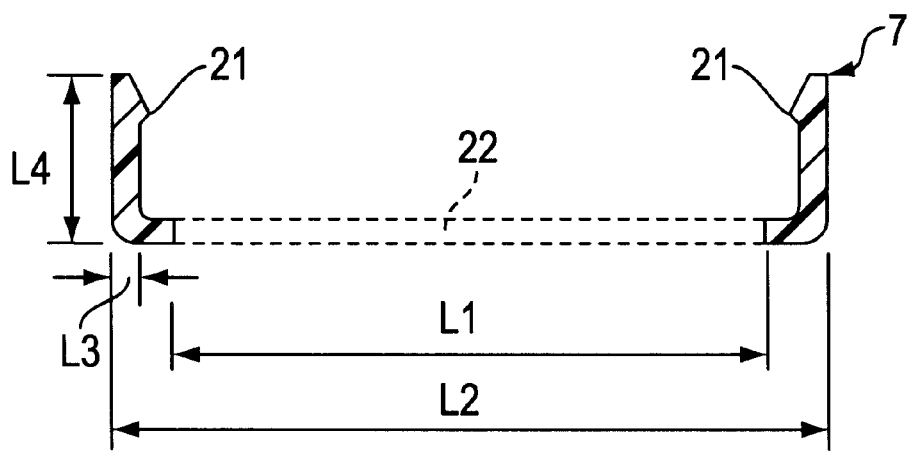

FIGS. 2A and 2B show the structure of the gasket 7 before cell assembly, according to the embodiment of the invention. In assembling a cell, the gasket 7 is caulked with the cell can 1 so that the shape of the gasket 7 is partially deformed. FIG. 2A is a plan view of the gasket 7 and FIG. 2B is a cross sectional view taken along line IIB—IIB of FIG. 2A. The gasket 7 contains polybutylene terephthalate. The gasket 7 is generally tubular having an outer diameter L2 (e.g., 15.7 mm) and a height L4 (e.g., 3.6 mm). The top of the tubular gasket 7 is open, and the bottom has an opening 22 with a diameter L1 (e.g., 12.9 mm). The thickness of the tubular wall is L3 (e.g., 0.5 mm). A protrusion 21 is provided at the top inner circumference of the gasket 7. The protrusion 21 supports and fixes the lamination of the terminal cap 13, PTC ring 11, current breaker 10 and anti-explosion valve 9 shown in FIG. 1, at a predetermined position. The anti-explosion valve 9 is fitted about the opening 22 as shown in FIG. 1.

Next, a manufacture method of a cell using the sealing assembly including the gasket 7 of PBT will be described, by taking a cylinder type non-aqueous electrolyte secondary cell by way of example. Other types of secondary cells may also be manufactured.

As shown in FIG. 1, a wound electrode sheet assembly is inserted into the tubular metal cell can 1, and electrolyte is poured into the cell can 1. After the sealing assembly with the gasket 7 to be fixedly coupled to the cell can 1 is electrically connected to the electrode lead 8, the opening of the cell can 1 is hermetically sealed to complete a cylinder type cell. The sealing assembly is constituted of the gasket 7 of this embodiment and a lamination of the terminal cap 13, PTC ring 11, current breaker 10 and anti-explosion valve 9 stacked in this order from the upper position and fitted in the gasket 7.

Figure 3:
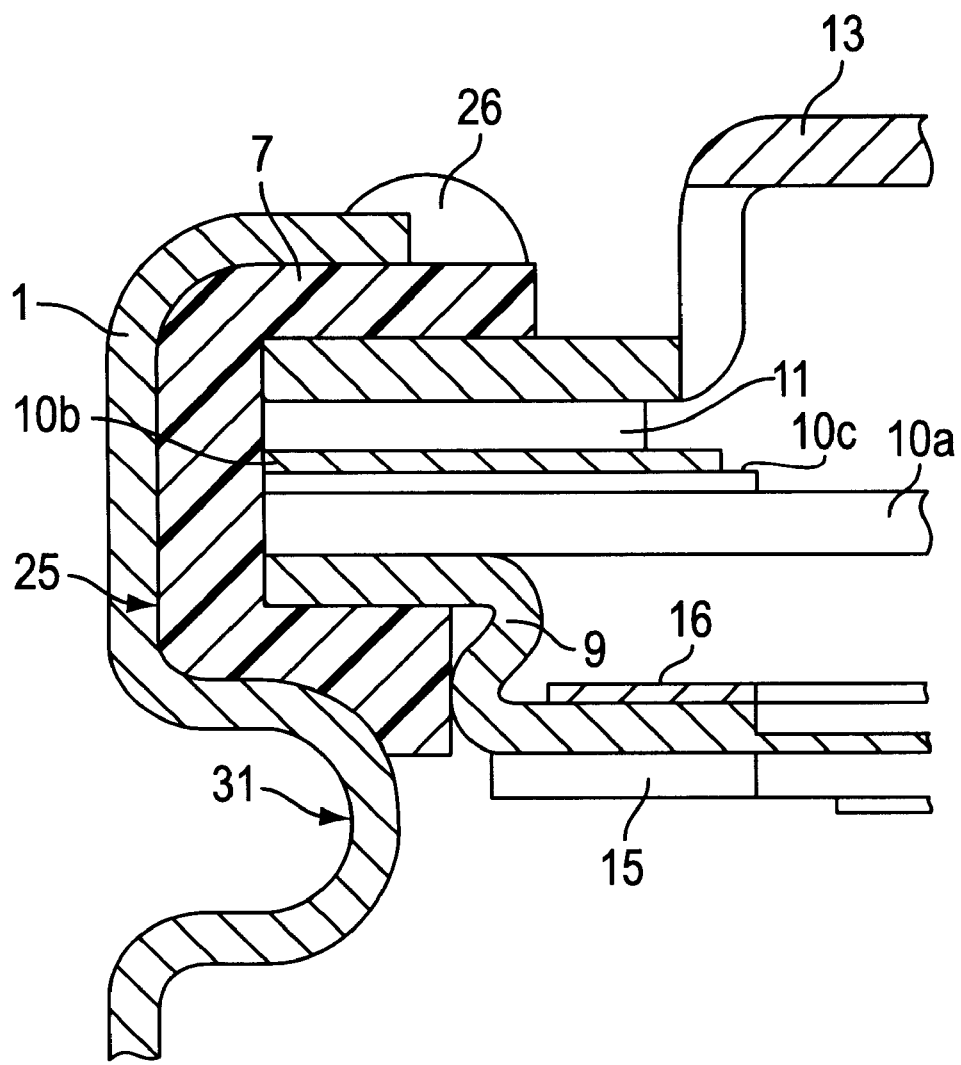
FIG. 3 is a diagram showing the gasket of FIGS. 2A and 2B and its nearby components.

FIG. 3 is a diagram showing the gasket shown in FIGS. 2A and 2B and its nearby components. Referring to FIG. 3, it is preferable to coat the gasket 7 on the cell can 1 side or the inner surface 25 of the beaded cell can 1 with sealing agent. Beading is a process of forming a concave 31 on the wall of the cell can 1 in order to support the lower portion of the gasket 7.

If a cell is stocked at a high temperature, a leakage phenomenon of liquid in the cell occurs easily. Specifically, if a cell stocked at a high temperature is cooled, electrolyte gradually leaks from the inside of the cell to the outside along the inner surface 25 of the cell can 1 in contact with the gasket 7. Electrolyte indicated at 27 is the leaked electrolyte. Since polybutylene terephthalate has a large elasticity and a high heat resistance temperature, the gasket 7 made of polybutylene terephthalate can prevent liquid leakage.

Materials for the cell can 1 may be, for example, nickel-plated steel plates, stainless steel plates (such as SUS 304, SUS 304L, SUS 304N, SUS 316, SUS 316L, SUS 430 and SUS 444), nickel-plated stainless steel plates (such as those listed above), aluminum or alloys thereof, nickel, titanium and copper, which may be in the form of cylinders having a circular-section, elliptic-section, square-section and rectangular-section. In particular, if the cell can simultaneously serves as a negative terminal, stainless steel plates and nickel-plated steel plates are preferred. While if the cell can simultaneously serves as a positive terminal, stainless steel plates, aluminum or alloys thereof are preferred.

The gasket 7 may be used with various types of cells. In the following, a cylinder type non-aqueous secondary cell having lithium as its active material will be described by way of example. Positive and negative electrodes used with a non-aqueous secondary cell can be formed by coating positive and negative depolarizing mixes on current collectors. The depolarizing mix for positive and negative electrodes may comprise, in addition to the active materials for the positive and negative electrodes, a conductivity-imparting agent, a binder, a dispersant, a filler, an ionic conductivity-imparting agent, a pressure increasing agent, and various types of additive material.

The active materials for positive electrodes may be any materials which allow free absorption and release of a light metal. Lithium-containing transition metal oxides are preferably used as the positive electrode active materials, examples of which are $Li_xCoO_2$, $Li_xNiO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMnO_2$, $LiMn_2O_3$, $Li_xMn_bCo_{2-b}O_z$, $Li_xMn_bNi_{2-b}O_z$, $Li_xMn_bV_{2-b}O_z$ and $Li_xMn_bFe_{1-b}O_z$ (wherein x=0.05 to 1.2, a=0.1 to 0.9, b=0.8 to 0.98 and z=1.5 to 5).

The term "light metal" used herein means elements belonging to Group 1A (except for hydrogen) and Group 2A of Periodic Table, with lithium, sodium and potassium, in particular, lithium being preferred.

The negative electrode materials may be any material which allows free absorption and release of a light metal. Examples of such materials are preferably graphite (natural, artificially synthesized and vapor phase grown graphite), coke (derived from coal or petroleum), calcined products of organic polymers (resins or fibers of polyacrylonitrile, furan resins, cresol resins, phenolic resins), calcined products of mesophase pitch, metal oxides, metal chalcogenides, and lithium-containing transition metal oxides and chalcogenides.

Oxides and chalcogenides are preferable for the negative electrode materials, which are made of a material or a combination of materials selected from a group consisting of Ge, Sn, Pb, Bi, Al, Ga, Si and Sb. Amorphous oxides and chalcogenides added with network formers such as $SiO_2$, $B_2O_3$, $P_2O_5$, $Al_2O_3$ and $V_2O_5$ are more preferable. These materials may be stoichiometric compounds or nonstoichiometric compounds.

Preferable examples of such compounds are enumerated in the following only for illustrative purpose.

GeO, $GeO_2$, SnO, $SnO_2$, $SnSiO_3$, PbO, SiO, $Sb_2O_5$, $Bi_2O_3$, $Li_2SiO_3$, $Li_4Si_2O_7$, $Li_2GeO_3$, $SnAl_{0.4}B_{0.5}P_{0.5}K_{0.1}O_{3.65}$, $SnAl_{0.4}B_{0.5}P_{0.5}Cs_{0.1}O_{3.65}$, $SnAl_{0.4}B_{0.5}P_{0.5}K_{0.1}Ge_{0.05}O_{3.85}$, $SnAl_{0.4}B_{0.5}P_{0.5}K_{0.1}Mg_{0.1}Ge_{0.02}O_{3.83}$, $SnAl_{0.4}B_{0.4}P_{0.4}Ba_{0.08}O_{3.28}$, $SnAl_{0.5}B_{0.4}P_{0.5}Mg_{0.1}F_{0.2}O_{3.65}$, $SnAl_{0.4}B_{0.5}P_{0.5}Cs_{0.1}Mg_{0.1}F_{0.2}O_{3.65}$, $SnB_{0.5}P_{0.5}Cs_{0.05}Mg_{0.05}F_{0.1}O_{3.03}$, $Sn_{1.1}Al_{0.4}B_{0.4}P_{0.4}Ba_{0.08}O_{3.34}$, $Sn_{1.2}Al_{0.5}B_{0.3}P_{0.4}Cs_{0.2}O_{3.5}$, $SnSi_{0.5}Al_{0.2}B_{0.1}P_{0.1}Mg_{0.1}O_{2.8}$, $SnSi_{0.5}Al_{0.3}B_{0.4}P_{0.5}O_{4.30}$, $SnSi_{0.6}Al_{0.1}B_{0.1}P_{0.1}Ba_{0.2}O_{2.95}$, $SnSi_{0.6}Al_{0.4}B_{0.2}Mg_{0.1}O_{3.2}$, $Sn_{0.9}Mn_{0.3}B_{0.4}P_{0.4}Ca_{0.1}Rb_{0.1}O_{2.95}$, $Sn_{0.9}Fe_{0.3}B_{0.4}P_{0.4}Ca_{0.1}Rb_{0.1}O_{2.95}$, $Sn_{0.3}Ge_{0.7}Ba_{0.1}P_{0.9}O_{3.35}$, $Sn_{0.9}Mn_{0.1}Mg_{0.1}P_{0.9}O_{3.35}$, and $Sn_{0.2}Mn_{0.8}Mg_{0.1}P_{0.9}O_{3.35}$.

The negative electrode material may contain light metal, particularly lithium. Lithium is preferably added electrochemically, chemically or thermally.

The amount of lithium added to the negative electrode material approximately corresponds to a lithium deposition potential. Lithium of 50 to 700 mol % is preferably added to the negative electrode material. Lithium of 100 to 600 mol % is more preferable.

The conductivity-imparting agent for positive and negative electrodes may be graphite, acetylene black, carbon black, ketchen black, carbon fibers, metal powders, metal fibers or polyphenylene derivatives. Of these materials, graphite and acetylene black are particularly preferred.

The binder for positive and negative electrodes may be polyacrylic acid, carboxymethyl cellulose, polytetrafluoroethylene, polyvinylidene fluoride, polyvinyl alcohol, starch, regenerated cellulose, diacetyl cellulose, hydroxypropyl cellulose, polyvinyl chloride, polyvinyl pyrrolidone, polyethylene, polypropylene, styrene-butadiene rubber (SBR), etylene-propylene-diene methylene linkage (EPDM), sulfonated EPDM, fluororubber, polybutadiene or polyethlene oxide. Of these materials, polyacrylic acid, carboxymethyl cellulose, polytetrafluoroethylene and polyvinylidene fluoride are particularly preferred. These materials are preferably used as water dispersed latex having a grain size of 1 micron or smaller.

Materials for supports or current collectors of the positive and negative electrodes may be aluminum, stainless steel, nickel, titanium or alloys thereof, for the positive electrode, and copper, stainless steel, nickel, titanium or alloys thereof, for the negative electrode. The support may have a shape such as a foil, expanded metal, punching metal or net. In particular, preferred are an aluminum foil for the positive electrode and a copper foil for the negative electrode.

Next, components of the cell shown in FIG. 1 other than the electrodes will be described. The separator 4 may be any insulating thin film having a high ion-permeability and desired mechanical strength, and examples of materials for the separator include olefine polymers, fluoropolymers, cellulosic polymers, polyimides, polyamides, glass fibers and alumina ($Al_2O_3$) fibers which may be used in the form of nonwoven fabrics, woven fabrics and microporous films. In particular, preferred materials are polypropylene, polyethylene, mixture of polypropylene and polyethylene, mixture of polypropylene and Teflon (registered trademark) and mixture of polyethylene and Teflon and preferred shapes of the separator include microporous films. Particularly preferred are microporous films each having a pore size ranging from 0.01 to 1 $\mu$m and a thickness ranging from 5 to 50 $\mu$m.

The electrolytes are preferably those obtained by dissolving at least one electrolyte selected from the group consisting of $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, lithium salts of lower aliphatic carboxylic acids, $LiAlCl_4$, LiCl, LiBr, LiI, chloroborane lithium salt and lithium tetraphenylborate, in an organic solvent comprising at least one member selected from the group consisting of propylene carbonate, ethylene carbonate, butylene carbonate, dimethyl carbonate, diethyl carbonate, 1, 2-dimethoxyethane, γ-butyrolactone, tetrahydrofuran, 2-methyl tetrahydrofuran, dimethylsulfoxide, dioxolan, 1, 3-dioxolan, formamide, dimethylformamide, nitromethane, acetonitrile, methyl formate, methyl acetate, methyl propionate, phosphoric acid triesters, trimethoxymethane, dioxolan derivatives, sulfolane, 3-methyl-2-oxazolidinone, propylene carbonate derivatives, tetrahydrofuran derivatives, diethyl ether and 1, 3-propanesultone. Particularly preferred are those obtained by dissolving $LiCF_3SO_3$, $LiClO_4$, $LiBF_4$ and/or $LiPF_6$ in a mixed solvent comprising propylene carbonate or ethylene carbonate and 1, 2-dimethoxyethane and/or diethyl carbonate and, in particular, the electrolyte preferably comprises at least ethylene carbonate and $LiPF_6$.

The cell is, if necessary, covered with an armoring material. Examples of such armoring materials are heat-shrinkable tubings, adhesive tapes, metal films, paper, cloths, paint and plastic cases. The armor may be partially composed of a portion which undergoes color change upon heating so that the heat history of the cell during use can be monitored.

A plurality of cells are optionally combined in series or parallel and accommodated in a cell-package. The cell package may be provided with a resistor having a positive temperature coefficient, a temperature fuse and safety elements such as a fuse and/or a current cutoff element as well as a safety circuit (i.e., a circuit having functions for monitoring, for instance, the voltage, temperature and current of each cell and/or a cell assembly and, if necessary, a circuit for cutting off the current). In addition, the cell package may comprise, in addition to positive and negative terminals for the entire cell assembly, external terminals such as positive and negative terminals for each cell, temperature-detecting terminals for the cell assembly and/or each cell and a current-detecting terminal for the cell assembly. Moreover, the cell package may comprise a built-in voltage-conversion circuit (such as DC-DC converter). Further, the connection of each cell may be performed by fixing the cell by welding the lead plate thereof or by fixing it through the use of, for instance, a socket so that it is easily removable. Moreover, the cell package may have a function for displaying the remaining capacity thereof, a necessity of charging, the number of use frequencies or the like.

The cell can be used in various apparatuses. In particular, the cell is preferably used in video movies, portable video decks provided with built-in monitors, movie cameras provided with built-in monitors, compact cameras, single-lens reflex cameras, disposable cameras, films provided with lenses, notebook-type personal computers, notebook-type word processors, electronic notebooks, portable telephones, cordless telephones, shavers, motor-driven tools, motor-driven mixers and motorcars.

The present invention will be described in more detail with reference to the following embodiments. The invention is not restricted to these specific embodiments, but should include various modifications so far as they are not beyond the scope of the present invention.

The sealing assembly was formed by the following steps. As shown in FIG. 1, the welded plate 15, anti-explosion valve 0 with insulating cover 16, current breaker 10, PTC element 11 and terminal cap 13 were laminated in this order. This lamination was fitted in the gasket 7 made of polybutylene terephthalate and coated with sealing agent on the side of the cell can 1. Polybutylene terephthalate had a thermal deformation temperature of 155° C. at a load of 4.6 kgf/cm$^2$, a Rockwell hardness of 75 in M scale and a tensile break expansion of 600%. Thereafter, the positive electrode lead 8 was welded to the welded plate 18 with laser to complete the sealing assembly. This sealing assembly is represented by A1 in Table 1. Other sealing assemblies A2 to A12 have material qualities of the gasket different from that of the assembly A1, as shown in Table 1. Each of the assemblies A1 to A12 had 100 samples. PBT represents polybutylene terephthalate, and PP represents polypropylene.

TABLE 1

| Sealing assembly No. | Polymer type | Thermal deformation temperature at load 4.6 kgf/cm$^2$ | Rockwell hardness M scale | Tensile break expansion |
|---|---|---|---|---|
| A1 | PBT | 155° C. | 75 | 600% |
| A2 | PBT | 155 | 75 | 350 |
| A3 | PBT | 155 | 75 | 100 |
| A4 | PBT | 160 | 80 | 20 |
| A5 | PBT | 160 | 85 | 20 |
| A6 | PBT | 180 | 80 | 25 |
| A7 | PBT | 220 | 93 | 4 |
| A8 | PBT | 228 | 90 | 2.5 |
| A9 | PP | 130 | 90 | 500 |
| A10 | 6, 6 Nylon | | | |
| A11 | 6, 6 Nylon 70 weight % blended with PBT (A1) 30 weight % | | | |
| A12 | 6, 6 Nylon 90 weight % blended with TOYOBO PELPRENE E-4500 (polyester elastomer) 10 weight % | | | |

Manufacture of Negative Electrode Sheet

Negative electrodes were prepared by adding, to the negative electrode materials of 77.5 weight % of $SnB_{0.5}O_3$, 17.01 weight % of black lead scales, and 0.94 weight % of lithium acetate, binders of 3.78 weight % of poly vinyl fluoride and 0.77 weight % of carboxymethyl cellulose, kneading the mixture together with water as a medium to give a negative electrode slurry. This slurry was applied onto both sides of a copper foil (current collector, thickness: 18 μm) by an extrusion method, and dried. The dried electrode sheet had a coated width of 500 mm and a thickness of 90 μm excluding the current collector.

Positive electrode sheets were prepared by mixing positive electrode materials of 92.71 weight % of $LiCoO_2$, 3.26 weight % of acetylene black and 0.93 weight % of sodium hydrogencarbonate, 1 weight % of polyvinylidenefluoride as binders, 1.66 weight % of copolymer of mainly ethylhexylacrylate and 0.44 weight % of carboxylmethylcellulose, kneading the mixture together with water as a medium to give a slurry. This slurry was applied onto both sides of an aluminum foil (current collector, thickness: 20 μm) by a method similar to the negative electrode sheet, and dried. The dried positive electrode sheet had a thickness of 270 μm excluding the current collector.

Assembly of Cylinder Cell

A nickel lead plate (negative electrode lead) and an aluminum lead plate (positive electrode lead) were spot-welded to the negative and positive electrode sheets. Thereafter, the electrode sheets were dried and dehydrated in a low humidity atmosphere (dew point: −40° C. or lower) for 30 minutes at 230° C. The dehydrated and dried positive electrode sheet 3, a microporous polypropylene film separator, the dehydrated and dried negative electrode sheet 2, and the separator 4 were laminated and wound by a winding machine in a vortex shape.

This wound roll was housed in the cylinder type cell can 1 having a bottom and made of nickel plated iron.

Electrolyte was poured into the cell can 11. The electrolyte contained 0.9 mol $LiPF_6$ and 0.1 mol $LiBF_4$ per one litter of solvent which is ethylene carbonate, butylene carbonate, dimethyl carbonate with a volume ratio of 2:2:6. Thereafter, the sealing assemblies A1 to A12 were inserted into cell cans 1, and the upper portion of each cell can 1 was caulked to complete cells D1 to D12.

Before the sealing assemblies were inserted into the cell cans, the positive electrode terminal 13 was connected to the positive electrode sheet 3 by a lead wire (plate), and the cell can was connected to the negative electrode sheet 2 by a lead wire (plate).

These cells were maintained at 105° C. for three days and thereafter cooled to the room temperature. Electrolyte leakage was tested the results of which are shown in Table 2.

TABLE 2

| Cell No. | Number of cells with leakage among 500 cells |
|---|---|
| D1 | 0 |
| D2 | 0 |
| D3 | 0 |
| D4 | 1 |
| D5 | 2 |
| D6 | 1 |
| D7 | 5 |
| D8 | 8 |
| D9 | 30 to 40 |
| D10 | 40 to 50 |
| D11 | 30 to 40 |
| D12 | 0 |

As shown in Table 2, electrolyte leakage was found in many cells using the sealing assemblies A9 and A10 whose gaskets were made of material different from PBT. The test results for these cells were not good. As compared to this, electrolyte leakage was found less in the cells using the sealing assemblies A1 to A8 whose gaskets were made of PBT. The sealing assembly whose gasket is made of PBT is therefore preferable. Electrolyte leakage was found in many cells using the sealing assembly A11 whose gasket was made of only 30 weight % of PBT. It is preferable that the gasket contains PBT, and particularly preferable that the gasket comprises 100 weight parts of PBT and 35 weight parts or less of additive material. Cells having the sealing assembly A12 made of 90 weight % showed no electrolyte leakage. It is more preferable that the gasket comprises 100 weight parts of PBT and 10 to 0.1 weight part of additive material.

Electrolyte leakage was found less in cells having the sealing assemblies A1 to A6 whose gasket material PBT had a thermal deformation temperature of 140 to 200° C. at a load of 4.6 kgf/cm$^2$. The test results for these cells were good. The sealing assemblies whose gasket material PBT had a Rockwell hardness of 60 to 110 in M scale, showed good results. Those with a Rockwell hardness of 70 to 90 were particularly good. A tensile break expansion of PBT is preferably in a range from 100% or larger to 600% or lower.

What is claimed is:

1. A cell comprising a metal cell can, a metal terminal cap, and a gasket comprising polybutylene terephthalate for sealing the metal cell can with the metal terminal cap.

2. A cell according to claim 1, further comprising non-aqueous electrolyte placed in the metal cell can.

3. A cell according to claim 1, wherein polybutylene terephthalate has a thermal deformation temperature of 140 to 200° C. at a load of 4.6 kgf/cm$^2$ by ASTM-D648 measurement and a Rockwell hardness, as stipulated by ASTM-D785, of 60 to 110 in M scale.

4. A cell according to claim 1, wherein polybutylene terephthalate has a tensile break expansion, as stipulated by ASTM-D638, in a range from 25% or larger to smaller than 1000%.

5. A cell according to claim 3, wherein polybutylene terephthalate has a thermal deformation temperature of 150 to 180° C. at a load of 4.6 kgf/cm$^2$ by ASTM-D648 measurement and a Rockwell hardness, as stipulated by ASTM-D785, of 70 to 90 in M scale.

6. A cell according to claim 1, wherein the gasket consists of 100 weight parts of polybutylene terephthalate and 35 weight parts or less of additive material.

7. A cell according to claim 6, wherein the gasket comprises 100 weight parts of polybutylene terephthalate and 20 weight parts or less of additive material.

8. A cell according to claim 7, wherein the gasket comprises 100 weight parts of polybutylene terephthalate and 0.1 weight part or less of additive material.

9. A cell according to claim 5, wherein polybutylene terephthalate has a tensile break expansion, as stipulated by ASTM-D638, in a range from 25% or larger to smaller than 1000%.

10. A cell according to claim 3, wherein polybutylene terephthalate has a tensile break expansion, as stipulated by ASTM-D638, in a range from 100% or larger to smaller than 600%.

11. A cell according to claim 10, wherein polybutylene terephthalate has a tensile break expansion, as stipulated by ASTM-D638, in a range from 100% or larger to smaller than 600%.

* * * * *